US012614738B2

(12) United States Patent
Diessner et al.

(10) Patent No.: US 12,614,738 B2
(45) Date of Patent: Apr. 28, 2026

(54) BIPOLAR PLATE FOR AN ELECTROCHEMICAL CELL, ARRANGEMENT OF ELECTROCHEMICAL CELLS, AND METHOD FOR OPERATING AN ARRANGEMENT OF ELECTROCHEMICAL CELLS

(71) Applicant: Robert Bosch GmbH, Stuttgart (DE)

(72) Inventors: Christian Diessner, Muehlacker-Muehlhausen (DE); Harald Schmeisser, Stuttgart (DE); Jochen Wessner, Esslingen (DE); Stefan Schoenbauer, Ditzingen (DE); Ulrich Berner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 524 days.

(21) Appl. No.: 18/254,003

(22) PCT Filed: Oct. 25, 2021

(86) PCT No.: PCT/EP2021/079479
§ 371 (c)(1),
(2) Date: May 23, 2023

(87) PCT Pub. No.: WO2022/111924
PCT Pub. Date: Jun. 2, 2022

(65) Prior Publication Data
US 2024/0097150 A1      Mar. 21, 2024

(30) Foreign Application Priority Data

Nov. 30, 2020    (DE) ..................... 10 2020 215 022.2

(51) Int. Cl.
H01M 8/0258     (2016.01)
H01M 8/0206     (2016.01)
(Continued)

(52) U.S. Cl.
CPC ....... *H01M 8/0258* (2013.01); *H01M 8/0206* (2013.01); *H01M 8/0228* (2013.01); *H01M 8/0247* (2013.01); *H01M 8/0254* (2013.01)

(58) Field of Classification Search
None
See application file for complete search history.

(56) References Cited

U.S. PATENT DOCUMENTS

| | | | |
|---|---|---|---|
| 10,763,521 B2 * | 9/2020 | Tomana | H01M 8/0254 |
| 2007/0231619 A1 * | 10/2007 | Strobel | H01M 8/2457 |
| | | | 429/534 |

(Continued)

FOREIGN PATENT DOCUMENTS

| | | |
|---|---|---|
| DE | 10158772 C1 | 6/2003 |
| DE | 10248531 B4 | 10/2005 |

(Continued)

OTHER PUBLICATIONS

Translation of International Search Report for Application No. PCT/EP2021/079479 dated Feb. 14, 2022 (2 pages).

*Primary Examiner* — Jonathan Crepeau
(74) *Attorney, Agent, or Firm* — Michael Best & Friedrich LLP

(57)      ABSTRACT

The invention relates to a bipolar plate (7) for an electro-chemical cell (1), said bipolar plate comprising at least one first monopolar plate (13) having a first bead (15) and a second monopolar plate (17) having a second bead (19), the first bead (15) and the second bead (19) being arranged opposite one another and forming a channel (21), the first bead (15) and the second bead (19) each comprising a central base surface (23) and at least two inclined surfaces (24) and the first bead (15) and/or the second bead (19) comprising at least one outer base surface (25), and wherein the at least one outer base surface (25) and/or the central base surface (23) have at least one opening (27) for the
(Continued)

passage of at least one medium (29). The invention also relates to an arrangement of electrochemical cells (1) and a method for operating an arrangement of electrochemical cells (1).

20 Claims, 8 Drawing Sheets

(51) Int. Cl.
    *H01M 8/0228*        (2016.01)
    *H01M 8/0247*        (2016.01)
    *H01M 8/0254*        (2016.01)

(56)                   References Cited

U.S. PATENT DOCUMENTS

| | | | |
|---|---|---|---|
| 2017/0229714 A1* | 8/2017 | Beutel | H01M 8/0247 |
| 2019/0088956 A1* | 3/2019 | Glueck | H01M 8/0254 |
| 2022/0149392 A1* | 5/2022 | Kunz | H01M 8/0254 |

FOREIGN PATENT DOCUMENTS

| | | | |
|---|---|---|---|
| DE | 202015104972 U1 | 12/2016 | |
| DE | 202019101145 U1 | 5/2020 | |
| EP | 3350863 | 7/2018 | |
| JP | 4959190 B2 | 6/2012 | |
| KR | 101730105 B1 * | 4/2017 | |

* cited by examiner

BIPOLAR PLATE FOR AN ELECTROCHEMICAL CELL, ARRANGEMENT OF ELECTROCHEMICAL CELLS, AND METHOD FOR OPERATING AN ARRANGEMENT OF ELECTROCHEMICAL CELLS

BACKGROUND

The invention relates to a bipolar plate for an electrochemical cell comprising at least a first monopolar plate having a first bead and a second monopolar plate having a second bead, wherein the first bead and the second bead are arranged opposite one another and form a channel, wherein the first bead and the second bead in each case comprise a central base surface and at least two inclined surfaces. Furthermore, the invention relates to an arrangement of electrochemical cells and a method for operating an arrangement of electrochemical cells.

Electrochemical cells are electrochemical energy transducers and are known in the form of fuel cells or electrolyzers.

A fuel cell converts chemical reaction energy into electrical energy. In known fuel cells, hydrogen ($H_2$) and oxygen ($O_2$) are in particular converted to water ($H_2O$), electrical energy, and heat.

Among others, proton-exchange membrane (PEM) fuel cells are known. Proton-exchange membrane fuel cells comprise a centrally arranged membrane that is permeable to protons, i.e., hydrogen ions. The oxidizing agent, in particular atmospheric oxygen, is thereby spatially separated from the fuel, in particular hydrogen.

Fuel cells comprise an anode and a cathode. The fuel is continuously supplied to the fuel cell at the anode and catalytically oxidized with loss of electrons to form protons that reach the cathode. The lost electrons are discharged from the fuel cell and flow via an external circuit to the cathode. The oxidizing agent is supplied to the fuel cell at the cathode and reacts to form water by receiving the electrons from the external circuit and protons. The resulting water is drained from the fuel cell. The gross reaction is:

$$O_2 + 4H^+ + 4e^- \rightarrow 2H_2O$$

A voltage is applied between the anode and the cathode of the fuel cell. In order to increase the voltage, multiple fuel cells can be mechanically arranged one behind the other to form a fuel cell stack, which can also be referred to as a fuel cell setup, and can be electrically connected in series.

A stack of electrochemical cells, which can be referred to as an arrangement of electrochemical cells, typically has end plates that press the individual cells together and impart stability to the stack.

The electrodes, i.e. the anode and the cathode, and the membrane can be structurally assembled to form a membrane-electrode assembly (MEA).

Stacks of electrochemical cells further have bipolar plates, also referred to as gas distributor plates or distributor plates. Bipolar plates serve to distribute the fuel evenly to the anode and to distribute the oxidizing agent evenly to the cathode. In addition to the media guidance with respect to oxygen, hydrogen, water, and if applicable a coolant, the bipolar plates ensure a planar electrical contact to the membrane.

A fuel cell stack typically comprises up to a few hundred individual fuel cells stacked one on top of the other in layers. The individual fuel cells comprise one MEA as well as one bipolar plate half each on the anode side and on the cathode side. In particular, a fuel cell comprises an anode monopolar plate and a cathode monopolar plate, typically each in the form of embossed sheets, which together form the bipolar plate and thus form channels for guiding gas and liquids, between which the cooling medium can flow.

Furthermore, electrochemical cells typically comprise gas diffusion layers arranged between a bipolar plate and a MEA.

By contrast to a fuel cell, an electrolyzer is an energy converter, which, while applying electrical voltage, preferably splits water into hydrogen and oxygen. Electrolyzers also have MEAs, bipolar plates, and gas diffusion layers, among other things.

Electrochemical cells in a stack are often supplied with the media, in particular hydrogen and oxygen, or these media are discharged via media channels arranged perpendicular to the membrane of the electrochemical cell. The media channels are fluidly connected to the electrochemical cells, in particular to the bipolar plates, by ports that can also be referred to as fluid terminals. The media channels are typically located on the edge of the stack and are often generated by congruently overlapping recesses forming the ports. From the ports, the media are fed through port grommets into the so-called flow-field, the active surface of the bipolar plate and the membrane, respectively.

In particular, the port grommets for air or hydrogen facing the MEA are to be designed so that the port grommets provide as large an opening as possible for the inflowing and outflowing media and on the other hand provide as good a mechanical support effect for seals arranged on the opposite side of the MEA.

DE 10158772 C1 and DE 10248531 B4 relate to fuel cell stacks with a layering of multiple fuel cells, wherein media are fed or discharged by bipolar plates and bead arrangements are provided for the sealing.

SUMMARY

A bipolar plate for an electrochemical cell is proposed, said bipolar plate comprising at least one first monopolar plate having a first bead and a second monopolar plate having a second bead, wherein the first bead and the second bead are arranged opposite one another and form a channel, wherein the first bead and the second bead in each case comprise a central base surface and at least two inclined surfaces and the first bead and/or the second bead comprise at least one outer base surface, and wherein the at least one outer base surface and/or the central base surface have at least one opening for the passage of at least one medium. Furthermore, an arrangement of electrochemical cells comprising the bipolar plate is proposed, as well as a method for operating the arrangement of electrochemical cells, wherein the at least one medium is guided from the channel and/or into the channel in a flow direction through the at least one opening of the first monopolar plate and/or the second monopolar plate, wherein the flow direction in the at least one opening is substantially perpendicular to the first monopolar plate and/or the second monopolar plate.

Preferably, the electrochemical cell, which is preferably a fuel cell or an electrolyzer, preferably comprises at least one bipolar plate according to the invention, at least one gas diffusion layer, and at least one membrane or membrane-electrode arrangement. In particular, a membrane electrode arrangement is respectively arranged between two bipolar plates. Preferably, the arrangement of electrochemical cells, which is preferably a fuel cell stack, comprises at least one membrane electrode assembly and at least one bipolar plate according to the present invention, further preferably at least two bipolar plates according to the present invention.

The bipolar plate preferably has carbon such as graphite, a metal such as stainless steel or titanium, and/or an alloy containing the metal. Further preferably, the bipolar plate is constructed of carbon, metal, and/or alloy. Furthermore, the bipolar plate preferably comprises at least one port. The at least one port can be an inlet or an outlet. Preferably, the first bead and the second bead are arranged on the at least one port, and further preferably the first bead and the second bead surround the at least one port, in particular entirely. Further preferably, the first bead and the second bead surround exclusively the at least one port, and further preferably exclusively exactly one port.

Preferably, the at least one medium comprises hydrogen, air or oxygen, water, and/or a cooling medium, and further preferably the at least one medium comprises the cooling medium, hydrogen, or a mixture containing oxygen and/or water.

The first bead and/or the second bead can also be referred to as a metallic sealing bead, in particular. In particular, the first bead is formed by a portion of the first bipolar plate and the second bead is formed by a portion of the second bipolar plate. Accordingly, the first bipolar plate is preferably configured integrally with the first bead and the second bipolar plate is preferably configured integrally with the second bead.

Preferably, the first bead and the second bead form a seal element. The sealing element, which preferably seals the at least one port outwardly and against further media, is overcome by the at least one medium, in particular through the at least one opening, in order to optionally first enter a distributor structure and then onto the active surface.

The at least one opening can also be referred to as a through-opening, breakthrough, or interruption of the first bead or the second bead. Preferably, the first bead and/or the second bead comprise a plurality of openings. The at least one opening has a preferably round cross-sectional surface area. In particular, the at least two inclined surfaces, in particular all of the at least two inclined surfaces, are free of openings for passing the at least one medium.

The base surfaces can also be referred to as base plates and preferably provide horizontal regions, wherein the at least one outer base surface and/or the central base surface is utilized to pass the at least one medium through the first monopolar plate and the second monopolar plate, respectively. Further preferably, only the at least one outer base surface and/or the central base surface is used in order to pass the at least one medium through the first monopolar plate or the second monopolar plate.

Preferably, the central base surface and the at least one outer base surface of the first bead and/or the second bead are each arranged substantially parallel to one another. By "substantially parallel," it is understood that the central base surface having the at least one outer base surface encloses an angle of no more than 30°, further preferably no more than 20°, and in particular no more than 10°. The first bead and/or the second bead can each have more than one outer base surface, for example two outer base surfaces.

The central base surface is preferably arranged between two inclined surfaces, respectively. The at least two inclined surfaces can also be referred to as legs or flanks. Furthermore, the at least two inclined surfaces are inclined, in particular opposite the central base surface and the at least one outer base surface. Preferably, an inclination angle between one of the at least two inclined surfaces and the central base surface or the at least one outer base surface is within a range of 90° to 150°, further preferably 900 to 120°.

The central base surface and the at least one outer base surface are preferably planar surfaces. The at least two inclined surfaces can be contoured, i.e. having at least one curve. Preferably, the at least two inclined surfaces, which are respectively arranged adjacent to the central base surface, preferably have an angle of inclination with an opposite sign.

Preferably, at least two outer base surfaces each comprise at least one opening, and further preferably at least two openings, each of which are arranged on different outer base surfaces, are arranged opposite one another or offset from one another, in particular relative to a central plane of the channel. Further preferably, the central base surface is arranged between a first outer base surface and a second outer base surface, wherein the first outer base surface comprises at least a first opening and the second outer base surface comprises at least a second opening, and the first opening and the second opening can be arranged opposite one another or offset from one another relative to the central plane.

In particular, the central base surface of the first bead and/or the second bead can additionally comprise at least one opening. Also, the membrane-electrode assembly can comprise at least one opening, wherein the at least one opening is preferably arranged on a frame of the membrane-electrode assembly, which can also be referred to as a reinforcement or gasket. The frame is in particular made of a plastic.

The channel has the fictitious central plane, which is preferably arranged substantially perpendicular to the central base surface and/or the at least one outer base surface, and further preferably intersects the central base surface of the first bead and the second bead. The central plane can be the symmetry plane of the channel.

Preferably, on at least one side of the central plane, the at least one opening is arranged on the first bead at a first distance from the central plane, and a second distance from an outer edge of the central base surface of the second bead of the central plane is at least as large as, and further preferably larger than, the first distance. Also, on one side of the central plane, the at least one opening on the second bead can be arranged at the first distance from the central plane and the second distance can be measured from the outer edge of the central base surface of the first bead. In particular, the first distance means a maximum distance of the circumference of the at least one opening from the central plane.

Preferably, the central base surface at the at least one opening has a respective indentation. Furthermore, the at least one outer base surface at the at least one opening comprises a respective protrusion or represents a respective protrusion. Accordingly, the second distance, relative to the central base surface of the first bead and/or the second bead, and/or a width of the at least one outer base surface, can vary over a length of the first bead and/or the second bead, respectively, on one or both sides of the central plane. Further preferably, the second distance and width of the at least one outer base surface can alternately vary so that the central base surface becomes narrower at one opening, at least on one side of the central plane, wherein the at least one outer base surface on which the opening is located becomes wider at the opening. Preferably, the second distance of the central base surface in the second bead is constant, in particular when the second bead has no opening. The second distance and/or width of the central base surface can vary in an undulating manner.

The central base surface preferably has a first height, relative to a base level of the first monopolar plate and the second monopolar plate, respectively.

In a first preferred embodiment, the at least one outer base surface, in particular the at least one opening, is arranged on no more than an inclined surface, i.e. bounded by no more than one inclined surface. The at least one outer base surface is correspondingly preferably arranged at a second height, which is further preferably less than 10% of the first height. In particular, the at least one outer base surface is arranged at the base level.

In a second preferred embodiment, the first bead and/or the second bead respectively have at least three inclined surfaces, in particular three or four inclined surfaces, wherein the at least one outer base surface is arranged in particular directly between two inclined surfaces and forms a step, in particular between the two inclined surfaces. The step preferably has a third height, wherein the third height is less than the first height and further preferably the third height is 20% to 80%, more preferably 30% to 70%, in particular 40% to 60%, of the first height. Further preferably, the inclined surfaces arranged on the same side of the central base surface or adjoining the same step have the same inclination angle. In particular, the step comprises the at least one opening. Further preferably, the first bead and/or the second bead can comprise at least two, further preferably precisely two, steps, wherein more preferably the central base surface, in particular the central plane, is arranged between the two steps.

Preferably, the first bead and the second bead comprise a total of two outer base surfaces, in particular steps, and the central base surface, in particular the first bead and the second bead, is preferably arranged between, relative to a cross-sectional view, the two outer base surfaces, in particular steps, wherein the two outer base surfaces, in particular steps, are arranged on the first bead or on the second bead or a first outer base surface, in particular step, on the first bead and a second outer base surface, in particular step, on the second bead. Accordingly, the first outer base surface, in particular the step, and the second outer base surface, in particular the step, are preferably arranged on different sides of the central base surfaces and in particular of the central plane. Preferably, at least one opening is arranged on the first outer base surface, in particular step, and at least one opening is arranged on the second outer base surface, in particular step. If the first outer base surface, in particular step, is arranged on the first bead and the second outer base surface, in particular step, is arranged on the second bead, and if the first outer base surface, in particular step, and the second outer base surface, in particular step, are arranged on different sides of the central plane, then an inlet and outlet for the at least one medium are located on different sides of the bipolar plate.

Furthermore, for example, the first bead can comprise two outer base surfaces, in particular steps, which in particular each comprise at least one opening, wherein the central base surface is arranged between the two outer base surfaces, in particular steps, and wherein the second bead cannot have an opening.

If the first bead has at least two openings, in particular on at least two different outer base surfaces, in particular steps, an inlet and an outlet for the at least one medium are arranged on the same side of the bipolar plate or on the first monopolar plate.

The first bead and the second bead can be symmetrical or asymmetrical to one another. The first bead and/or the second bead, in particular the channel, can be symmetrical in a cross-sectional view, in particular towards the central plane. The first bead can also be referred to as an upper bead, and the second bead can also be referred to as a lower bead, or vice versa.

Furthermore, the first bead and the second bead can be arranged offset from one another, wherein, in particular in a plan view, the central base surface of the first bead overlaps with the outer base surface of the second bead, or vice versa. Preferably, in this embodiment, the first bead and the second bead respectively have at least one opening at opposite outer base surfaces.

In an embodiment of the arrangement of electrochemical cells, the arrangement comprises at least a first bipolar plate, a second bipolar plate, and a membrane electrode arrangement, wherein the membrane-electrode assembly is arranged between the first bipolar plate and the second bipolar plate and the membrane-electrode assembly comprises at least one opening. Preferably, the central base surface of the second bead of the first bipolar plate, the central base surface of the first bead of the second bipolar plate, and the membrane-electrode assembly have a respective opening, wherein these openings are further preferably in alignment with one another.

Preferably, the central base surface of the first bead and/or the second bead has a respective seal. Further preferably, the central base surface of the first bead and the central base surface of the second bead have a respective seal. The seal has a seal width that is at most as large as twice the second distance of the central base surface of the first bead and the second bead, respectively. Further preferably, the seal width is less than twice the second distance. More preferably, the seal width is constant over the length of the first bead and/or the second bead.

The seal is preferably embodied as a coating. Further preferably, the seal comprises a polymer, such as an elastomer, and more preferably the seal comprises a material selected from the group consisting of silicone, rubber, in particular fluoro-rubber (FKM), polytetrafluorethylene (PTFE), and mixtures thereof.

Combinations of the described embodiments are possible.

By arranging the at least one opening on the at least one outer base surface, the at least one opening lies in a non-deformed region of the bipolar plate, which facilitates production. By arranging the at least one opening on a horizontal surface of the bipolar plate, the cutting line for the opening lies in a planar region of the sheet from which the bipolar plate is typically produced. Thus, standard cylindrical hole punches can be used, or at least two-dimensional tool contours, i.e. those lying in a plane, can be selected so that the tools can in particular be simply subsequently polished.

Furthermore, the bead structure is not weakened on the inclined surfaces by the at least one opening, so that an even distribution of forces can be ensured in the bead.

The steps further create additional horizontal regions that can be utilized in order to arrange the at least one opening.

BRIEF DESCRIPTION OF THE DRAWINGS

Embodiments of the invention are explained in more detail with reference to the drawings and the following description.

The drawings show.

DETAILED DESCRIPTION

In the following description of the embodiments of the invention, identical or similar elements are denoted by identical reference numbers, wherein a repeated description of these elements is omitted in individual cases. The figures show the subject-matter of the invention only schematically.

Figure 1:
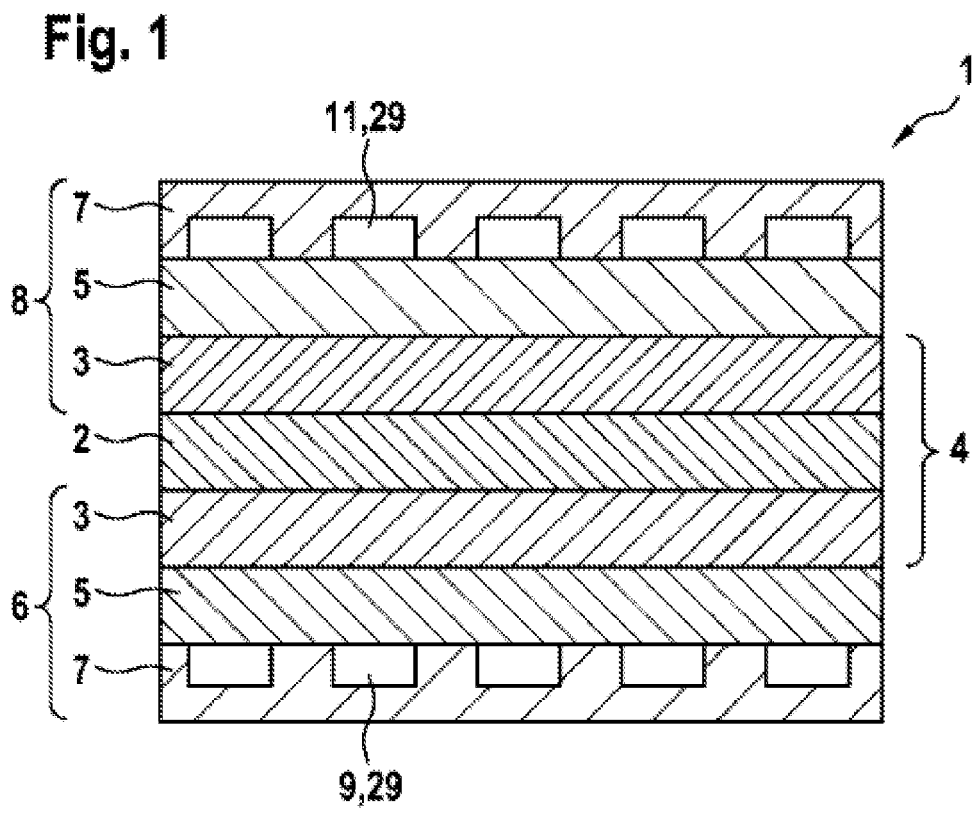
FIG. 1 a schematic illustration of an electrochemical cell.

FIG. 1 schematically shows an electrochemical cell 1 in the form of a fuel cell. The electrochemical cell 1 has a membrane 2 as electrolytes. The membrane 2 separates a cathode space 6 from an anode space 8.

A respective electrode layer 3, a gas diffusion layer 5, and a distributor plate 7 are arranged on the membrane 2 in the cathode space 6 and anode space 8. The connection of the membrane 2 and the electrode layer 3 can also be referred to as a membrane-electrode assembly 4.

Media 29 is supplied in the bipolar plates 7. Through the bipolar plate 7 in the cathode space 6, oxygen 9 reaches the gas diffusion layer 5, and through the bipolar plate 7 of the anode space 8, hydrogen 11 reaches the corresponding gas diffusion layer 5.

Figure 2:
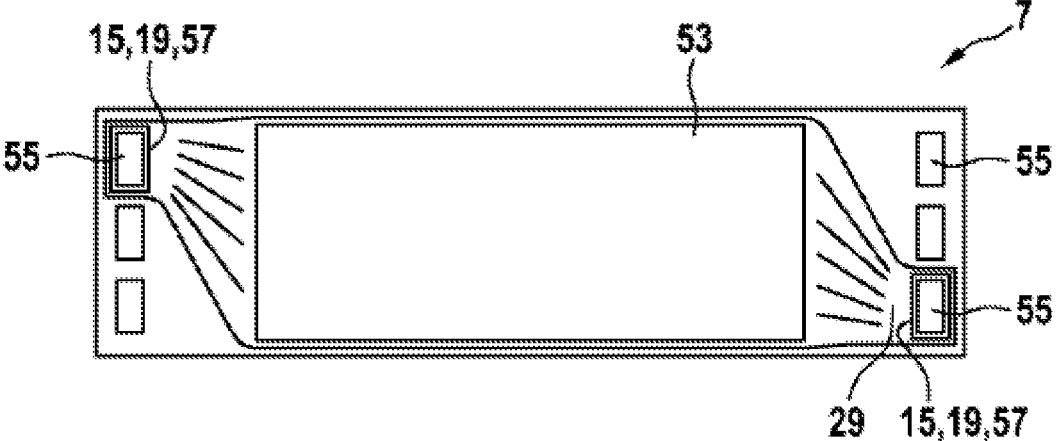
FIG. 2 a plan view of a bipolar plate.

FIG. 2 shows a plan view of a bipolar plate 7 having an active surface 53 multiple ports 55. Two ports 55 are each surrounded by and sealed by a bead arrangement 57, wherein the bead arrangement 57 is each formed by a first bead 15 and a second bead 19.

Figure 3:
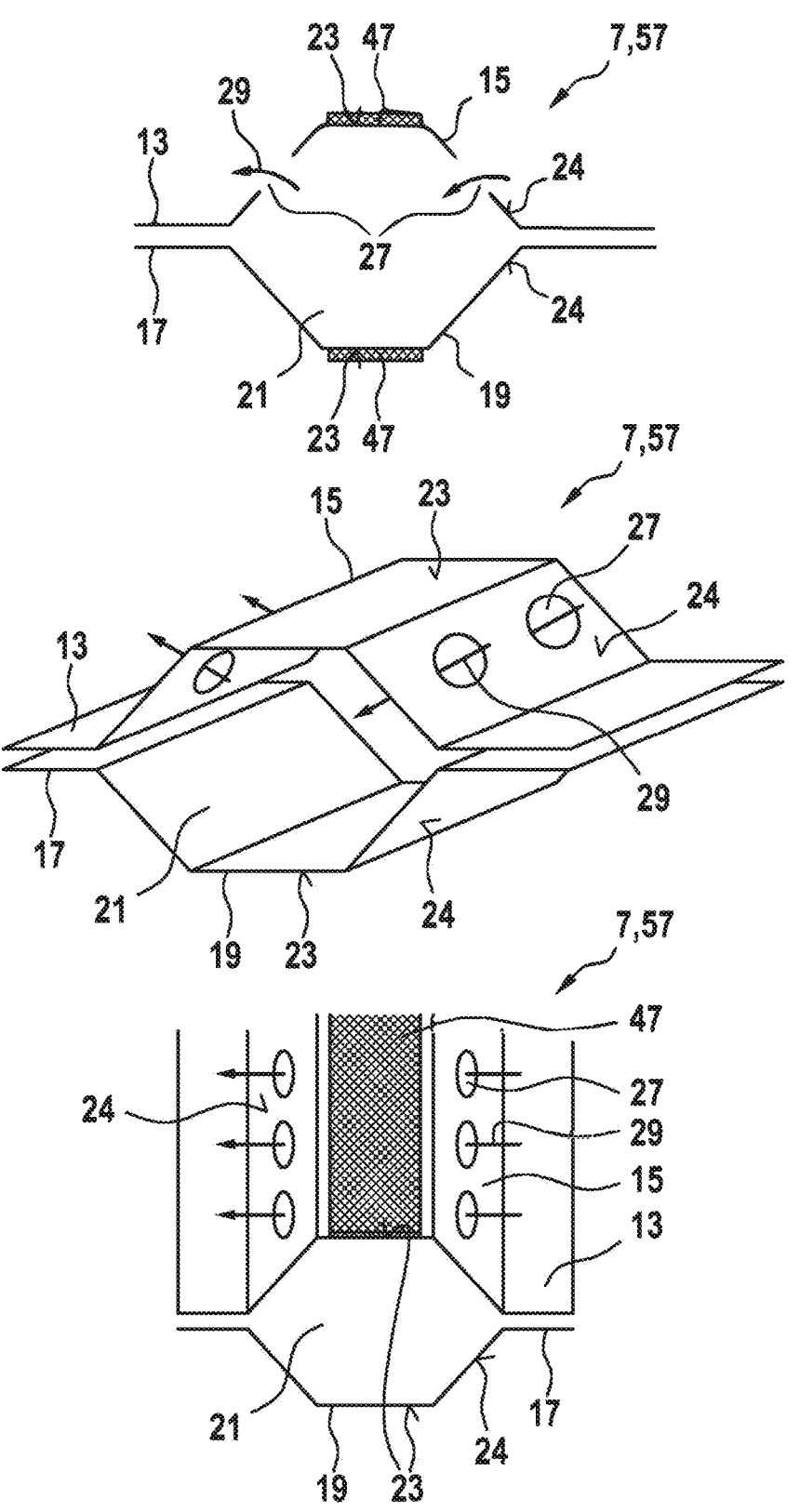
FIG. 3 a cross-sectional view, a perspective view, and a plan view of a section of a bipolar plate with a bead arrangement according to the prior art, FIG. 4 a perspective view of a bead arrangement with opposed openings in outer base surfaces, FIG. 5 a first cross-sectional view of the bead arrangement according to FIG. 4, FIG. 6 a second cross-sectional view of the bead arrangement according to FIG. 4, FIG. 7 a cross-sectional view of a bead arrangement with openings on a respective step on a first bead and a second bead, FIG. 8 a perspective view of the bead arrangement according to FIG. 7, FIG. 9 a cross-sectional view of a bead arrangement with openings on two steps of a first bead, FIG. 10 a perspective view of a bead arrangement with openings on two steps of a first bead, FIG. 11 a cross-sectional view of a further embodiment of a bead arrangement with openings on two steps of a first bead, FIG. 12 a cross-sectional view of a section of an arrangement of electrochemical cells with a first and a second bipolar plate, FIG. 13 a plan view of the second bipolar plate of the arrangement according to FIG. 12, and FIG. 14 a cross-sectional view of a bead arrangement with beads arranged offset from one another.

FIG. 3 shows a cross-sectional view, a perspective view, and a plan view of a section of a bipolar plate 7 with a bead arrangement 57 according to the prior art. The bipolar plate 7 comprises a first monopolar plate 13 having a first bead 15 and a second monopolar plate 17 having a second bead 19. The first bead 15 and the second bead 19 are arranged opposite one another and form a channel 21. The first bead 15 and the second bead 19 each comprise a central base surface 23 and two inclined surfaces 24. The inclined surfaces 24 have openings 27 through which a medium 29 can be guided. Furthermore, the first bead 15 and the second bead 19 have a respective seal 47 on the central base 23.

Figure 4:
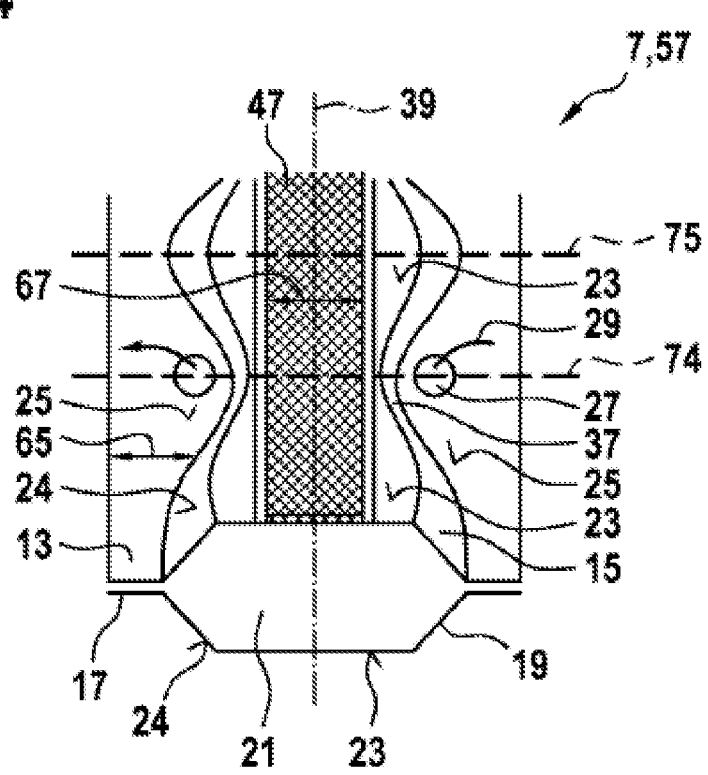

FIG. 4 shows a perspective view of a section of a bipolar plate 7 with a bead arrangement 57. By contrast to the bead arrangement 57 shown in FIG. 3, the first bead 15 has outer base surfaces 25 on which at least one opening 27 is arranged for passing the medium 29. The illustrated openings 27 are arranged opposite one another, and the central base surface 23 has a respective indentation 37 at the openings 27. Furthermore, the outer base surface 25 has a width 65, and the seal 47 has a sealing width 67, and a first sectional plane 74 and a second sectional plane 75 are shown.

Figure 5:
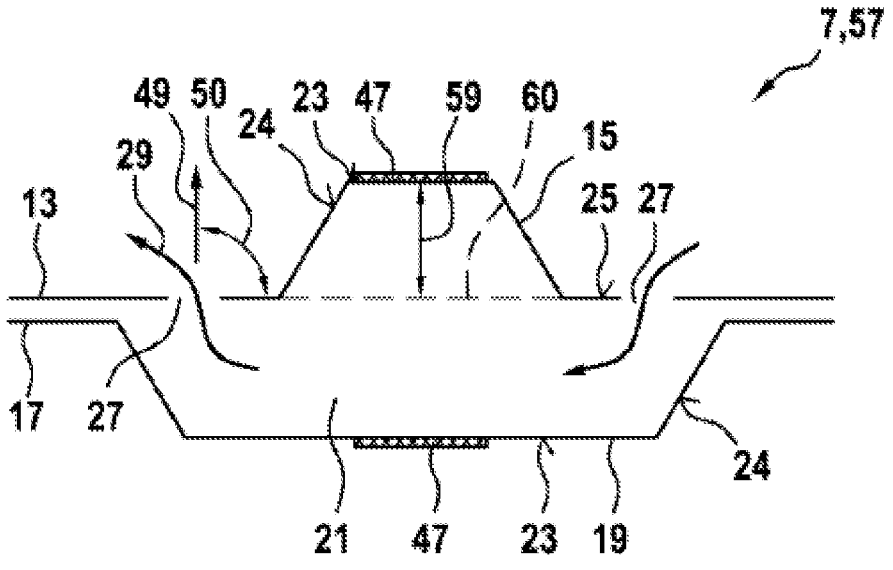

FIG. 5 shows a cross-sectional view of the bead arrangement 57 according to FIG. 4 along the first sectional plane 74. The central base surface 23 has a first height 59 relative to a base level 60. Furthermore, a direction of flow 49 is marked in one of the openings 27, which direction is aligned with a flow angle 50 substantially perpendicular to the first monopolar plate 13.

Figure 6:
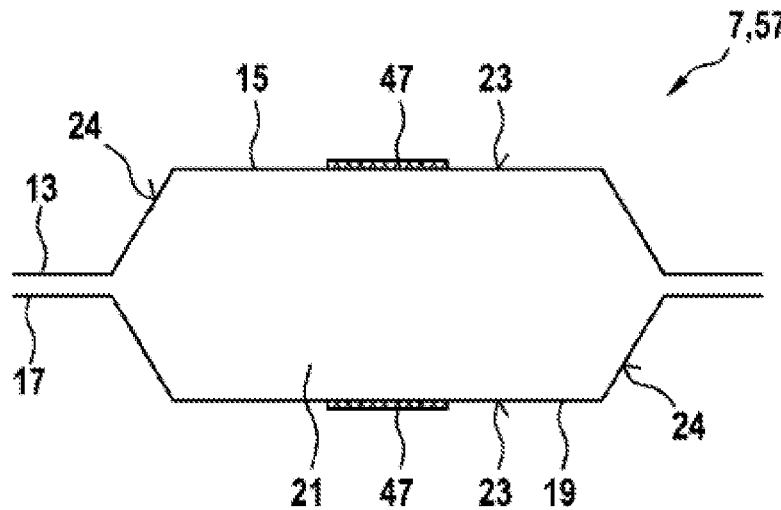

FIG. 6 shows a cross-sectional view of the bead arrangement 57 according to FIG. 4 along the second sectional plane 75. It can be seen that the central base surface 23 of the first bead 15 is narrower at the openings 27 through the indentations 37, i.e. in the first sectional plane 74, than in the second sectional plane 75, in which no opening 27 is located.

Figure 7:
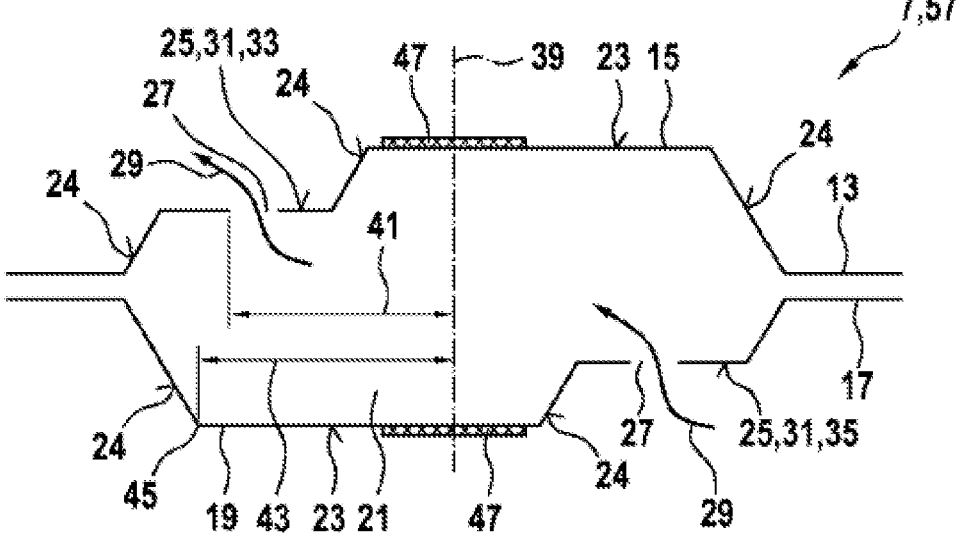

FIG. 7 shows a cross-sectional view of a section of a bipolar plate 7 comprising a further bead arrangement 57. The first bead 15 and the second bead 19 have a respective step 31 formed by an outer base surface 25 and on which respective openings 27 are arranged. Both central base surfaces 23 are arranged between a first step 33 of the first bead 15 and a second step 35 of the second bead 19. Accordingly, the first step 33 and the second step 35 are located on different sides, relative to the cross-sectional view, of a central plane 39 of the formed channel 21. The openings 27 on the first bead 15 are arranged at a first distance 41 from the central plane 39, and a second distance 43 from an outer edge 45 of the central base surface 23 of the second bead 19 is greater than the first distance 41. Accordingly, the central base surface 23 of the second bead 19 projects beyond the openings 27 of the first bead 15.

Figure 8:
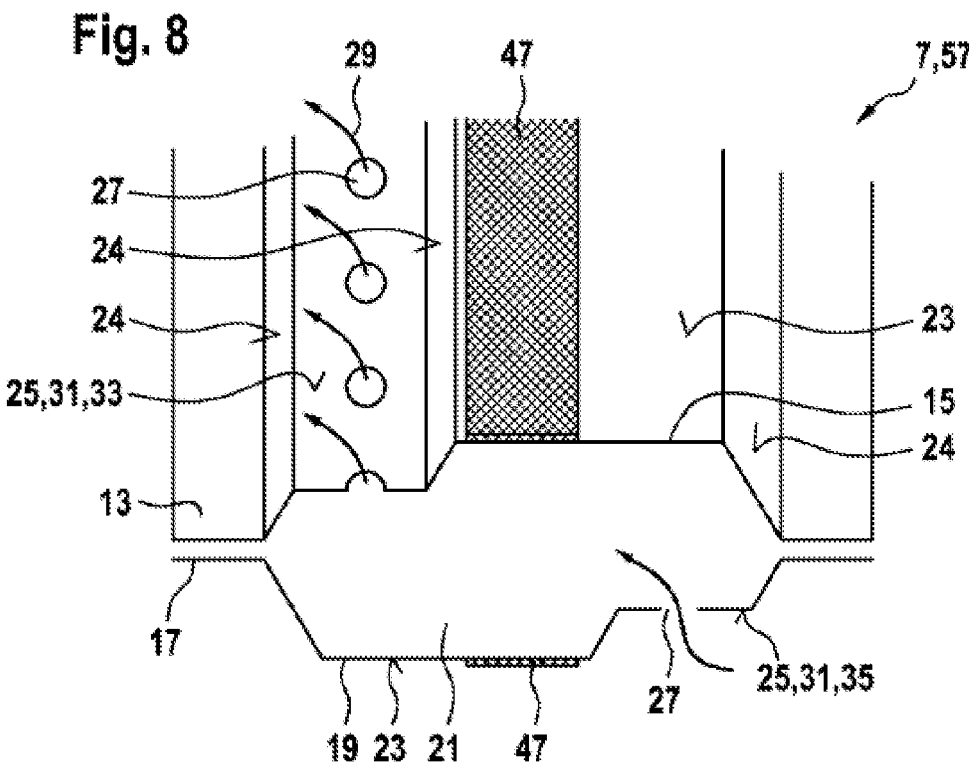

FIG. 8 shows a perspective view of a section of a bipolar plate 7 with a bead arrangement 57, which substantially corresponds to the bead arrangement 57 according to FIG. 7, with the difference that the openings 27 of the first bead 15 are respectively offset and are not arranged oppositely to the openings 27 of the second bead 19.

Figure 9:
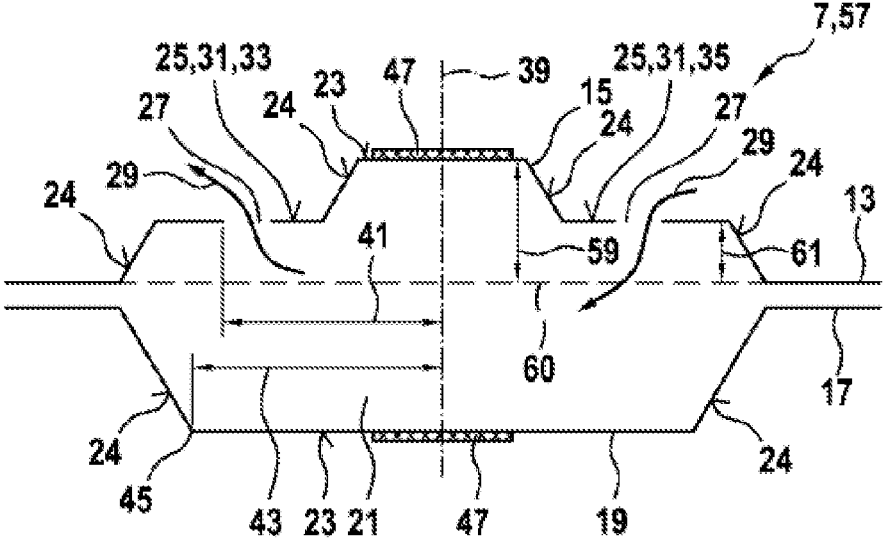

FIG. 9 shows a cross-sectional view of a section of a bipolar plate 7 with yet another bead arrangement 57. The first bead 15 has two steps 31, wherein the central base surface 23 is arranged between a first step 33 and a second step 35. The central base surface 23 has a first height 59, and the step 31 has a second height 61 that is less than the first height 59. The central base surface 23 of the second bead 19 projects on both sides of the central plane 39 beyond the openings 27 of the first bead 15.

Figure 10:
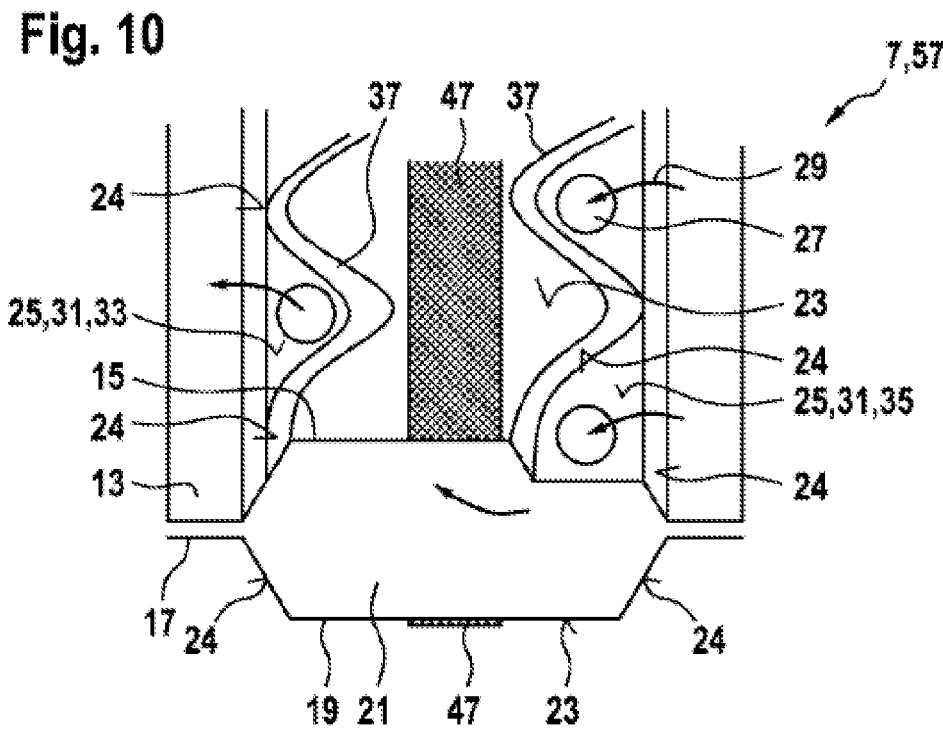

FIG. 10 shows a perspective view of a section of a bipolar plate 7 with a bead arrangement 57, which substantially corresponds to the bead arrangement 57 according to FIG. 9, with the difference that the openings 27 of the first step 33 and the second step 35 are arranged offset from one another and not opposite to one another.

Figure 11:
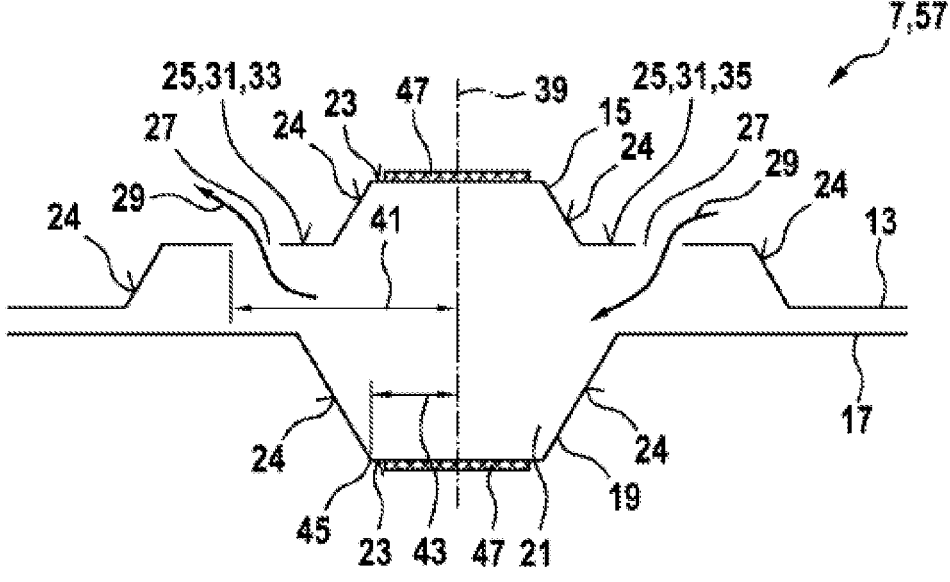

FIG. 11 shows a cross-sectional view of a bead arrangement 57, which substantially corresponds to the bead arrangement 57 according to FIG. 9, with the difference that the central base surface 23 of the first bead 15 and the central base surface 23 of the second bead 19 are equal in width and thus a first distance 41 from the openings 27 to the central plane 39 is greater than a second distance 43 from the outer edge 45 of the central base surface 23 of the second bead 19.

Figure 12:
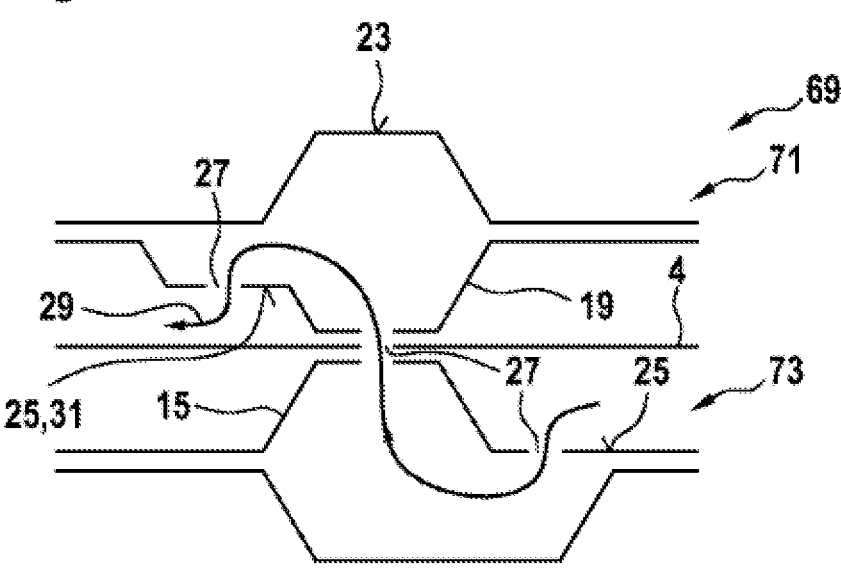

FIG. 12 shows a cross-sectional view of a section of an arrangement 69 of electrochemical cells 1 having a first bipolar plate 71 and a second bipolar plate 73. A membrane-electrode assembly 4, which can comprise a gasket, is arranged between the first bipolar plate 71 and the second bipolar plate 73. The central base surface 23 of the second bead 19 of the first bipolar plate 71, the central base surface 23 of the first bead 15 of the second bipolar plate 73, and the membrane electrode assembly 4 have a respective opening 27, and these openings 27 are arranged in an aligned manner such that the at least one medium 29 flows through the membrane electrode assembly 4 from the first bead 15 of the second bipolar plate 73 into the second bead 19 of the first bipolar plate 71.

Figure 13:
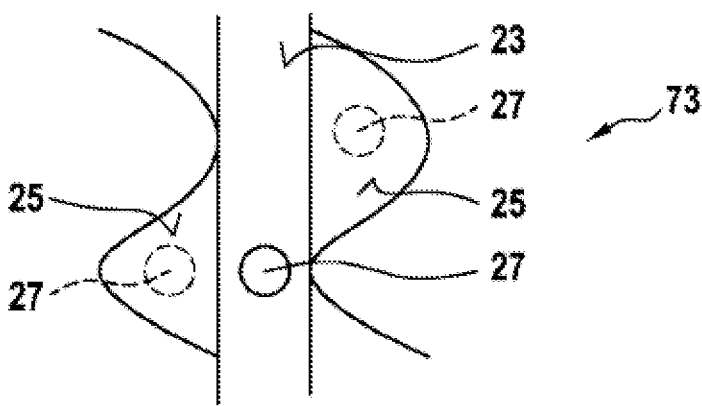

FIG. 13 shows a plan view of the second bipolar plate 73 of the arrangement 69 according to FIG. 12. The opening 27 on the central base surface 23 is discernible, as are openings 27 on outer base surfaces 25 of the underlying planes.

Figure 14:
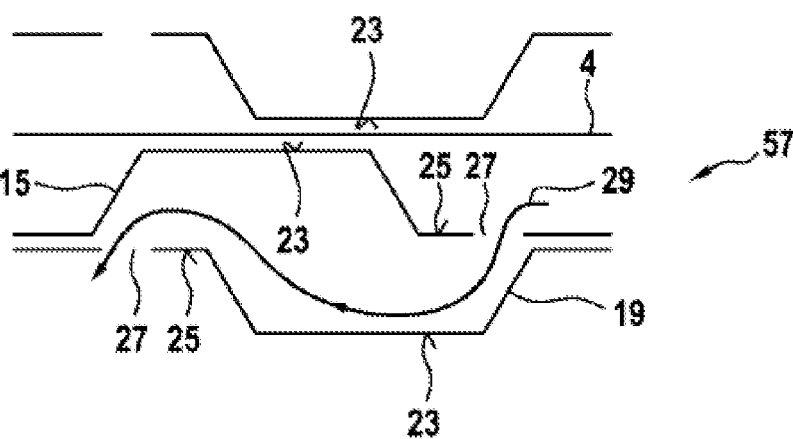

FIG. 14 shows a cross-sectional view of a bead arrangement 57 in which a first bead 15 and a second bead 19 are arranged offset from one another. The at least one medium 29 passes through an opening 27 in an outer base surface 25 of the first bead 15 into the bead. arrangement 57 and exits it via an opening 27 in an outer base surface 25 of the second bead 19.

The invention is not limited to the embodiment examples described herein and the aspects highlighted therein. Rather, a variety of modifications, which are within the scope of activities of the person skilled in the art, is possible within the range specified by the claims.

The invention claimed is:

1. A bipolar plate (7) for an electrochemical cell (1), the bipolar plate (7) comprising
   at least one first monopolar plate (13) having a first bead (15) and a second monopolar plate (17) having a second bead (19),
   wherein the first bead (15) and the second bead (19) are arranged opposite one another and form a channel (21),
   wherein the first bead (15) and the second bead (19) each comprise a central base surface (23) and at least two inclined surfaces (24) and the first bead (15) and/or the second bead (19) comprise at least one outer base surface (25),
   wherein the at least one outer base surface (25) and/or the central base surface (23) have at least one opening (27) for the passage of at least one medium (29), and
   wherein the first bead (15) and/or the second bead (19) comprise at least three inclined surfaces (24), wherein the at least one outer base surface (25) is arranged between two of the at least three inclined surfaces (24) and forms a step (31).

2. The bipolar plate (7) according to claim 1, wherein the first bead (15) and the second bead (19) comprise a total of two outer base surfaces (25), and the central base surface (23) is respectively arranged between the two outer base surfaces (25), wherein the two outer base surfaces (25) are arranged on the first bead (15) or on the second bead (19) or an outer base surface (25) on the first bead (15) and an outer base surface (25) on the second bead (19).

3. The bipolar plate (7) according to claim 1, wherein at least two outer base surfaces (25) respectively comprise at least one opening (27), and at least two openings (27), each arranged on different outer base surfaces (25), are arranged opposite to or offset from one another.

4. The bipolar plate (7) according to claim 1, wherein the respective central base surface (23) at the at least one opening (27) has an indentation (37).

5. The bipolar plate (7) according to claim 1, wherein the channel (21) has a central plane (39) and, on at least one side of the central plane (39), the at least one opening (27) on the first bead (15) is arranged at a first distance (41) from the central plane (39) and a second distance (43) from an outer edge (45) of the central base surface (23) of the second bead (19) to the central plane (39) is at least as large as the first distance (41).

6. The bipolar plate (7) according to claim 1, wherein the first bead (15) and the second bead (19) are arranged offset from one another.

7. The bipolar plate (7) according to claim 1, wherein the central base surface (23) of the first bead (15) and/or second bead (19) comprises a respective seal (47).

8. An arrangement (69) of electrochemical cells (1) comprising at least one bipolar plate (7) according to claim 1.

9. The arrangement (69) of electrochemical cells (1) according to claim 8, wherein the arrangement (69) comprises at least a first bipolar plate (7, 71), a second bipolar plate (7, 73), and a membrane-electrode assembly (4), the membrane-electrode assembly (4) is arranged between the first bipolar plate (7, 71) and the second bipolar plate (7, 73).

10. A method for operating an arrangement (69) of electrochemical cells (1) according to claim 8, wherein the at least one medium (29) is guided from the channel (21) and/or into the channel (21) in a flow direction (49) through the at least one opening (27) of the first monopolar plate (13) and/or the second monopolar plate (17), wherein the flow direction (49) in the at least one opening (27) is substantially perpendicular to the first monopolar plate (13) and/or the second monopolar plate (17).

11. The bipolar plate (7) according to claim 1, wherein the first bead (15) comprises at least one outer base surface (25), and
   wherein the at least one outer base surface (25) and/or the central base surface (23) have at least one opening (27) for the passage of at least one medium (29).

12. The bipolar plate (7) according to claim 11, wherein the at least one outer base surface (25) has the at least one opening (27) for the passage of at least one medium (29).

13. The bipolar plate (7) according to claim 11, wherein the central base surface (23) has the at least one opening (27) for the passage of at least one medium (29).

14. The bipolar plate (7) according to claim 1, wherein both of the first bead (15) and the second bead (19) comprise at least one outer base surface (25), and
   wherein both of the at least one outer base surface (25) and the central base surface (23) have at least one opening (27) for the passage of at least one medium (29).

15. The bipolar plate (7) according to claim 1, wherein the first bead (15) and the second bead (19) each comprise at least three inclined surfaces (24), wherein the at least one outer base surface (25) is arranged between two of the at least three inclined surfaces (24) and forms a step (31).

16. The bipolar plate (7) according to claim 1, wherein the first bead (15) includes two steps (31), and the central base surface (23) is respectively arranged between the two steps (31).

17. The arrangement (69) of electrochemical cells (1) according to claim 8, wherein the arrangement (69) comprises at least a first bipolar plate (7, 71), a second bipolar plate (7, 73), and a membrane-electrode assembly (4), the membrane-electrode assembly (4) is arranged between the first bipolar plate (7, 71) and the second bipolar plate (7, 73), and the central base surface (23) of the second bead (19) of the first bipolar plate (7, 71), the central base surface (23) of the first bead (15) of the second bipolar plate (7, 73), and the membrane-electrode arrangement (4) comprise a respective opening (27) and these openings (27) are aligned with one another.

18. A method for operating an arrangement (69) of electrochemical cells (1) according to claim 17, wherein the at least one medium (29) is guided from the channel (21) and into the channel (21) in a flow direction (49) through the at least one opening (27) of the first monopolar plate (13) and the second monopolar plate (17), wherein the flow direction (49) in the at least one opening (27) is substantially perpendicular to the first monopolar plate (13) and the second monopolar plate (17).

19. A bipolar plate (7) for an electrochemical cell (1), the bipolar plate (7) comprising at least one first monopolar plate (13) having a first bead (15) and a second monopolar plate (17) having a second bead (19), wherein the first bead (15) and the second bead (19) are arranged opposite one another and form a channel (21), wherein the first bead (15) and the second bead (19) each comprise a central base surface (23) and at least two inclined surfaces (24) and the first bead (15) and/or the second bead (19) comprise at least one outer base surface (25), wherein the at least one outer base surface (25) and/or the central base surface (23) have at least one opening (27) for the passage of at least one medium (29), and wherein the channel (21) has a central plane (39) and, on at least one side of the central plane (39), the at least one opening (27) on the first bead (15) is arranged at a first distance (41) from the central plane (39) and a second distance (43) from an outer edge (45) of the central base surface (23) of the second bead (19) to the central plane (39) is at least as large as the first distance (41).

20. An arrangement (69) of electrochemical cells (1) comprising at least one bipolar plate (7), the bipolar plate (7) comprising at least one first monopolar plate (13) having a first bead (15) and a second monopolar plate (17) having a second bead (19), wherein the first bead (15) and the second bead (19) are arranged opposite one another and form a channel (21), wherein the first bead (15) and the second bead (19) each comprise a central base surface (23) and at least two inclined surfaces (24) and the first bead (15) and/or the second bead (19) comprise at least one outer base surface (25), wherein the at least one outer base surface (25) and/or the central base surface (23) have at least one opening (27) for the passage of at least one medium (29), wherein the arrangement (69) comprises at least a first bipolar plate (7, 71), a second bipolar plate (7, 73), and a membrane-electrode assembly (4), the membrane-electrode assembly (4) is arranged between the first bipolar plate (7, 71) and the second bipolar plate (7, 73), and the central base surface (23) of the second bead (19) of the first bipolar plate (7, 71), the central base surface (23) of the first bead (15) of the second bipolar plate (7, 73), and the membrane-electrode arrangement (4) comprise a respective opening (27) and these openings (27) are aligned with one another.

* * * * *